US006665593B2

(12) United States Patent
Otterbach et al.

(10) Patent No.: US 6,665,593 B2
(45) Date of Patent: Dec. 16, 2003

(54) DEVICE FOR DATA TRANSMISSION BETWEEN VEHICLE SENSORS AND A PROCESSOR IN A CONTROLLER

(75) Inventors: Jens Otterbach, Wenden (DE); Peter Taufer, Renningen (DE); Harald Tschentscher, Grossbottwar (DE); Davor Lukacic, Bodelshausen (DE); Bernhard Straub, Erligheim (DE); Michael Ulmer, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/276,152

(22) PCT Filed: Jan. 11, 2002

(86) PCT No.: PCT/DE02/00069

§ 371 (c)(1),
(2), (4) Date: May 5, 2003

(87) PCT Pub. No.: WO02/073568

PCT Pub. Date: Sep. 19, 2002

(65) Prior Publication Data

US 2003/0171853 A1 Sep. 11, 2003

(30) Foreign Application Priority Data

Mar. 9, 2001 (DE) ........................................ 101 11 265

(51) Int. Cl.[7] .................................................. G06F 7/00

(52) U.S. Cl. .............................................. 701/1; 701/33

(58) Field of Search ....................................... 701/1, 33

(56) References Cited

U.S. PATENT DOCUMENTS 4,023,753 A * 5/1977 Dobler .......................... 246/5
5,734,569 A 3/1998 Foreman et al.

FOREIGN PATENT DOCUMENTS

DE 0 250 698 A2 * 1/1987 ........... H04L/11/16
EP 09 246 22 6/1999

* cited by examiner

*Primary Examiner*—Yonel Beaulieu
(74) *Attorney, Agent, or Firm*—Kenyon & Kenyon

(57) ABSTRACT

A device for data transmission between vehicle sensors and a control unit, which is used to decode data telegrams having sensor data from the vehicle sensors and to reformat them into SPI (serial peripheral interface) data telegrams. Furthermore, an interface module of the control unit transmits the SPI data telegrams to the processor of the control unit. By using an alter bit, the processor determines whether to retrieve the newest sensor data or the preceding sensor data. The interface module converts the sensor data in each case into a 10-bit data field of an SPI data telegram, into which the interface module may supplement missing data. By counting out the edges, it is possible for the interface module to recognize the data telegrams from the sensors.

7 Claims, 3 Drawing Sheets

Fig. 3
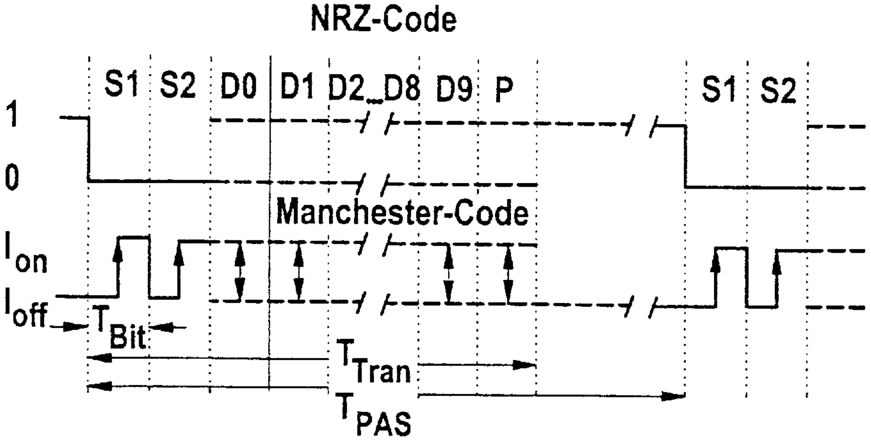
Fig. 4
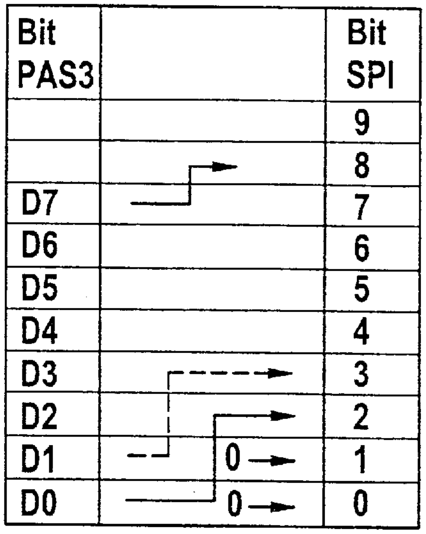
| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| SI | 1 | Channel address | | Age | | | | | | | | | | | | |
| SO | | | | 0 | | | 10 Bit sensor-data | | | | | | | | | |
Fig. 5

DEVICE FOR DATA TRANSMISSION BETWEEN VEHICLE SENSORS AND A PROCESSOR IN A CONTROLLER

FIELD OF THE INVENTION

The present invention relates to a device for transmitting data between vehicle sensors and a processor of a control unit.

BACKGROUND INFORMATION

In conventional communication systems for transmitting data between vehicle sensors and a processor of a control unit, it is possible to use special data telegrams for transmitting data between a sensor and a processor in a control unit.

SUMMARY

A device according to an example embodiment of the present invention for transmitting data between vehicle sensors and a processor for the control unit includes an interface module that receives first data telegrams from a plurality of vehicle sensors, captures the data from the first data telegrams, unformatted, and sends them on synchronously in second data telegrams to the processor within the control unit. It is thereby possible to let various sensors simultaneously transmit data to the control unit in different formats for the individual data telegrams between the interface module and the sensors. Therefore, the device according to the present invention is extremely flexible and expandable.

According to one implementation, the data field of the second data telegram is filled up with zeros, if, in the respective data telegram from the sensor, there is less data than the maximum level the data field can accommodate. Thereby, advantageously, the same data telegram format may be used for the processor. This leads to a simplified processing of the data.

In addition, according to an example embodiment of the present invention, a memory of the interface module may be included for temporary storage of sensor data, so that a processor may retrieve old or new sensor data. This is particularly advantageous when a sensor fails, and thus the preceding sensor data may still be available for further processing. This case may arise when there is a collision in which vehicle sensors that are situated peripherally in the vehicle are damaged by the impact.

According to an example embodiment of the present invention. the interface module receives the data telegrams from the vehicle sensors in 13-bit data frames, and counts out the edges of the data frames in order to recognize the data telegrams.

The vehicle sensors may be supplied with electrical energy by the interface module. The data transmission can used for this by a current modulation of the direct current used for the energy supply. The current modulation is less sensitive with regard to EMV problems. Furthermore, Manchester coding may be used, so that only two different current levels are used.

BRIEF DESCRIPTION OF THE DRAWINGS

FIG. 3 shows an example data telegram frame of a sensor.

FIG. 4 shows an example assignment of the data to an SPI data field.

FIG. 5 shows an example SPI data frame.

DETAILED DESCRIPTION

Because of the increasing integration of ever more sensors into a motor vehicle, which are used for sensing a vehicle crash, it is useful to allow for future sensors having new data telegrams to transmit data to the processor of a control unit that is already installed. To accomplish this, an interface module is provided according to the present invention which receives the individual data telegrams from the vehicle sensors and reformats the data into SPI (serial peripheral interface) data telegrams and then transmits them in such SPI data telegrams to the processor. In this context, advantageously, the interface module is connected to a memory which temporarily stores sensor data, and an alter bit makes it possible for the processor to select the current sensor data versus the preceding sensor data for transmission. Thus, the SPI data telegrams are not only transmitted by the interface module to the processor, but also the other way around.

Figure 6:
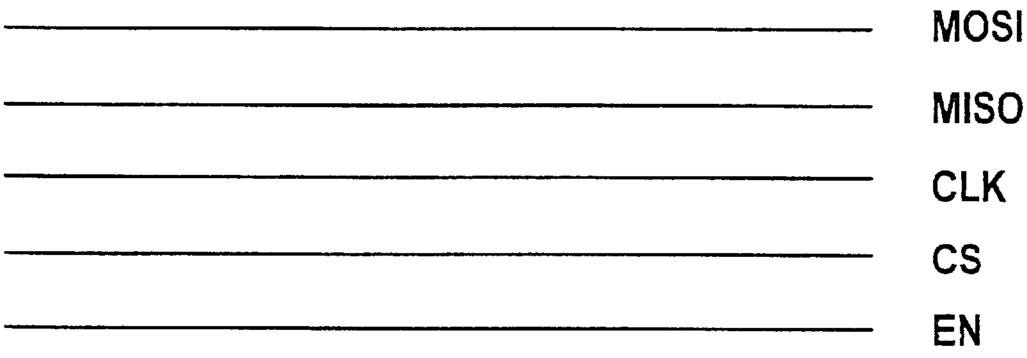
FIG. 6 shows an example SPI line.

SPI (serial peripheral interface) transmission is data transmission between a master, a processor and several slaves, which are the individual components in a control device such as the interface module according to the present invention, or a firing circuit control which is used for monitoring and firing the igniters for means of restraint. The SPI transmission is a bidirectional and synchronous transmission. FIG. 6 shows an SPI line which has five individual lines. For synchronous transmission, a timing circuit denoted as Clk is present. For data transmission from the master to a slave there is a MOSI (master out, slave in) line, but for data transmission from a slave to the master, a MISO (master in, slave out) line is present. In order to select the appropriate slave, the CS (chip select) line is used. In order to release the SPI data transmission, an enable line, here denoted as EN, is used. The SPI line starts at the master and then branches out to the individual slaves, the SPI line, however, having five single lines.

Figure 1:
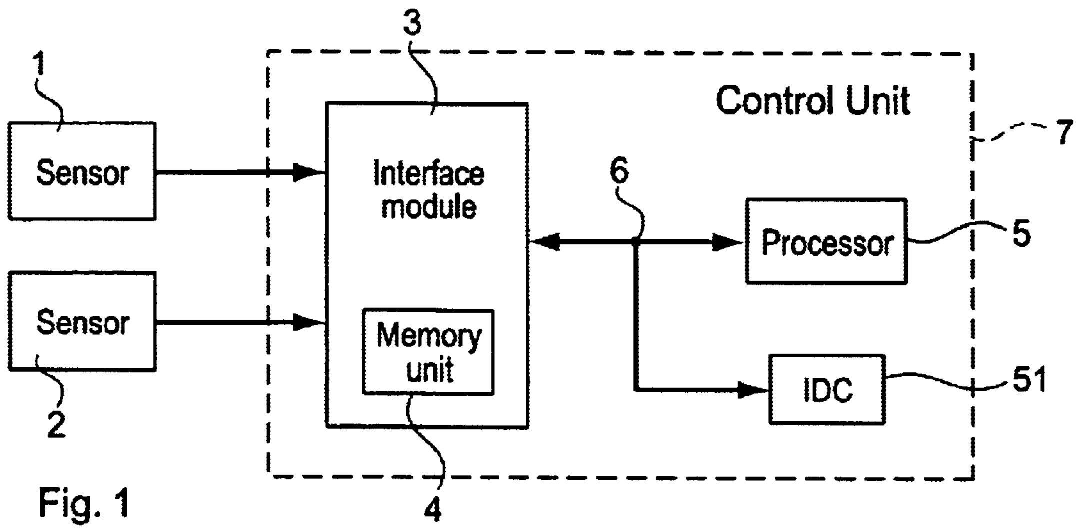
FIG. 1 is a block diagram of the device according to an example embodiment of the present invention.

FIG. 1 shows a block diagram of the device according to an example embodiment of the present invention. A sensor 1, for example, an acceleration sensor, or another type of peripheral sensor is connected to a first data input of an interface module 3 via a data input. A sensor 2, for example, a pressure sensor, is connected to interface module 3 via a second input of interface module 3. Interface module 3 has a memory unit 4. Interface module 3 is connected to a processor 5 via a first data input/output. For this an SPI line 6 is installed. SPI line 6 branches from processor 5 to an ignition drive circuit 51. Processor 5, interface module 3, SPI line 6, ignition drive circuit 51 and memory 4 are elements of a control unit 7. Control unit 7 is in this case used for the control of restraining systems.

Interface module 3 has means for data transmission and means for signal processing, in order to be able to attend to the task of reformatting. For this purpose, a memory 4 is included to aid in synchronization and sequence control. Furthermore, interface module 3 has a current source for supplying vehicle sensors 1 and 2 with electrical energy.

The connection to sensors 1 and 2 may also be implemented via a bus to interface module 3. Sensors 1 and 2 transmit their sensor data asynchronously in data telegrams to interface module 3, which takes from these data telegrams the useful data and reformats them into SPI data telegrams, which are then transmitted to processor 5 via SPI line 6. Sensors 1 and 2 begin immediately with asynchronous data transmission, as soon as they are supplied with energy. In this case, the energy supply takes place via the lines of interface module 3 to sensors 1 and 2. For this, direct current is used, on which the sensors then modulate their data. Manchester coding may be used in this instance, and a switching back and forth takes place between two current levels. Thus, apart from the energy supply, only one unidirectional data transmission takes place from sensors 1 and 2 to interface module 3.

In this connection, interface module 3 temporarily stores the received sensor data of a data telegram in memory 4, so that the processor 5 can retrieve the current and preceding sensor data from memory 4 in interface module 3. Thus, if a loss of the sensor occurs, processor 5 can access the sensor data, which the sensor had produced before it failed.

Figure 2:
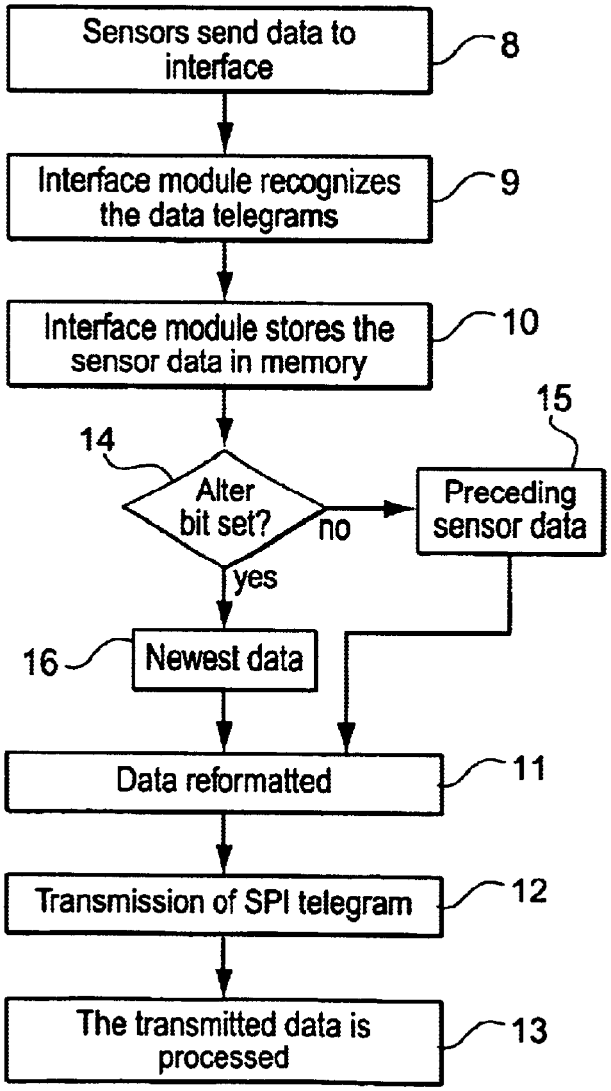
FIG. 2 is a flow chart of a method according to an example embodiment of the present invention.

FIG. 2 shows the block diagram of the sequence of the device according to an example embodiment of the present invention. In method step 8, sensors 1 and 2 send their sensor data asynchronously in first data telegrams to interface module 3, after they have been supplied with electrical energy via the line over which the data telegrams are sent. Accordingly, a powerline data transmission takes place. In method step 9, interface module 3 recognizes the individual data telegrams by counting off the edges of the impulses. In this context, it is possible to inform interface module 3 by further signals as to which sensors are sending data telegrams.

In method step 10, interface module 3 stores the sensor data in memory 4, storing for each sensor 1 and 2 both the current sensor value and the preceding sensor value. Method step 14 now checks whether the most recent sensor data or the preceding sensor data should be transmitted from memory 4 synchronously via SPI line 6 to processor 5 in SPI frames. This is recognized by whether processor 5 has set an alter bit via an SPI data telegram over the MOSI line or not. If this is the case, interface module 3 gets the newest data from memory 4 in method step 16. If not, interface module 3 gets the preceding sensor data from memory 4 in method step 15.

In method step 11, reformatting of the data by interface module 3 takes place, in that interface module 3 transmits the sensor data to the data files of SPI frames and may fill up the empty spaces in the SPI data field with zeros. Processor 5 recognizes the zeros as blank information. Using the selected sensor data, in method step 12 the transmission in an SPI data telegram takes place. In method step 13, processing of the sensor data thus transmitted by processor 5 takes place, for example, whether the restraining systems are to be triggered or not. Processor 5 here computes the release algorithm for the connected restraining systems. If the sensor data indicate a crash, then, according to the severity of the crash, which may also be derived from the sensor data, triggering of the restraining systems takes place.

FIG. 3 illustrates a data frame which is transmitted by sensor 1 or sensor 2 to interface module 3. The data frame is made up of 13 bits, and is subdivided in the following manner: two start bits are included, marked S1 and S2, which are followed by 10 data bits, which include acceleration data. The data bits are numbered from D0 through D9. The deactivation of the data frame is formed by a parity bit for the plausibility check of the data transmitted in the data telegram. A bit duration of 8 microseconds, for example, is provided here, whereas the time $t_{tran}$ is specified as 88 microseconds and the total time of the data telegram $t_{pas}$ is specified as 28 microseconds. A Manchester coding is applied, in this context each bit duration being divided up into two intervals of equal length. In this connection, a logical 1 is represented by having the current high in the first half and low in the second half. On the other hand, a logical 0 is transmitted by having the current low at first and then high. This scheme guarantees that each bit duration has a transition in the middle, which makes synchronizing easy for the receiver, that is, interface module 3. A better stability with regard to EMV (electromagnetic compatibility) is achieved by the current modulation.

FIG. 4 represents how the seven data bits of a data telegram of a sensor, here of sensor 2, are transmitted to the 10 data bits of the SPI data field. Since the SPI data field has two bits more than the 8 data of the sensor data telegram, the first two bits are set using zeros. This is to ensure that the data telegrams of the sensors each have fewer, or at most as many data bits as the SPI data telegrams have. FIG. 5 shows such a data telegram of an SPI data frame. It begins with a start bit SI which is followed by a synchronization bit 15, which is set by a 1. Bits 14 and 13 form a channel address, while bit 12 is the alter bit. The alter bit is set here as 0, and it means that the sensor is requesting the newest sensor value from interface module 3. Bits 11 and 10 are additional formatting data, upon which there follow the 10 data bits which have the actual sensor data.

What is claimed is:

1. A device for transmitting data between vehicle sensors and a control unit, comprising:

an interface module configured to decode a first data telegram having sensor data transmitted asynchronously from a first one of the vehicle sensors, and reformat the first data telegram into a second data telegram, the interface module further configured to synchronously transmit the second data telegram to a processor of the control unit.

2. The device of claim 1, wherein the interface module is further configured to copy the sensor data of the first data telegram into a data field of the second data telegram and supplement missing data.

3. The device of claim 1, wherein the interface module includes a memory unit configured to temporarily store the first sensor data, and wherein the second data telegram has an alter bit, the memory unit including a first data field for old field sensor data and a second data field for new sensor data, the processor setting the alter bit to select between the old sensor data and the new sensor data.

4. The device of claim 1, wherein the interface module is configured to receive the first data telegram in 13-bit data frames having edges, and the interface module is configured to count out the edges in order to recognize the first data telegram.

5. The device of claim 1, wherein the interface module supplies the vehicle sensors with electrical energy.

6. The device of claim 1, wherein the first one of the vehicle sensors is configured to create the first data telegram by a current modulation.

7. The device of claim 1, wherein the first one of the vehicle sensors is configured to code the first data telegram using Manchester coding.

* * * * *